US008956423B2

(12) United States Patent
Ouziel

(10) Patent No.: US 8,956,423 B2
(45) Date of Patent: Feb. 17, 2015

(54) METHOD OF INCREASING CHLORINE FASTNESS

(71) Applicant: Huntsman International LLC, The Woodlands, TX (US)

(72) Inventor: Philippe Ouziel, Altkirch (FR)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 14/355,587

(22) PCT Filed: Oct. 16, 2012

(86) PCT No.: PCT/EP2012/070475
§ 371 (c)(1),
(2) Date: May 1, 2014

(87) PCT Pub. No.: WO2013/068207
PCT Pub. Date: May 16, 2013

(65) Prior Publication Data
US 2014/0259455 A1 Sep. 18, 2014

(30) Foreign Application Priority Data
Nov. 7, 2011 (EP) .................................... 11188092

(51) Int. Cl.
*D06P 5/02* (2006.01)
*D06M 23/06* (2006.01)
*C07D 335/00* (2006.01)
*C07D 407/02* (2006.01)
*D06M 13/12* (2006.01)
*C08G 14/08* (2006.01)
*C08G 18/38* (2006.01)
*D06M 13/432* (2006.01)
*D06M 15/423* (2006.01)
*D06M 15/429* (2006.01)
*D06M 15/63* (2006.01)
*D06M 23/04* (2006.01)
*D06P 1/56* (2006.01)
*D06P 1/649* (2006.01)
*C08G 18/76* (2006.01)
*C08G 18/80* (2006.01)
*C08L 77/00* (2006.01)

(52) U.S. Cl.
CPC ............... *D06M 13/12* (2013.01); *C08G 14/08* (2013.01); *C08G 18/3859* (2013.01); *D06M 13/432* (2013.01); *D06M 15/423* (2013.01); *D06M 15/429* (2013.01); *D06M 15/63* (2013.01); *D06M 23/04* (2013.01); *D06P 1/56* (2013.01); *D06P 1/649* (2013.01); *C08G 18/7621* (2013.01); *C08G 18/8054* (2013.01); *C08L 77/00* (2013.01)
USPC .................. 8/442; 549/480; 564/17; 252/8.91

(58) Field of Classification Search
USPC .................. 8/442; 549/480; 564/17; 252/8.91
See application file for complete search history.

(56) References Cited

U.S. PATENT DOCUMENTS 3,428,607 A * 2/1969 Renner ......................... 528/232
3,778,413 A 12/1973 Junger et al.
5,155,164 A 10/1992 Graf et al.
5,252,375 A 10/1993 Turbak et al.

OTHER PUBLICATIONS

STIC Search Report dated Aug. 13, 2014.*
Database WPI; Week 198905; Thomson Scientific, London GB; AN 1989-036192; XP002674474 & JP 63 309682 A (Tokai Senko KK); Dec. 16, 1988; abstract.
Database WPI; Week 197608; Thomson Scientific, London GB; AN 1976-13984X; XP002674475 & JP 51 001799 A (Toyo Spinning Co Ltd); Jan. 8, 1976; abstract.
Database WPI; Week 199830; Thomson Scientific, London GB; AN 1988-343921; XP002674476 & JP 10 131060 A (Konishi Kagaku Kogyo KK); May 19, 1998; abstract.

* cited by examiner

*Primary Examiner* — Eisa Elhilo

(57) ABSTRACT

The present invention relates to a method of increasing the chlorine fastness of dyed synthetic polyamide fiber materials, which comprises treating the fiber material after dyeing with an aqueous liquor comprising a thiourea/formaldehyde/bisphenol condensate or a thiourea/polyisocyanate adduct.

10 Claims, No Drawings

METHOD OF INCREASING CHLORINE FASTNESS

CROSS REFERENCE TO RELATED APPLICATIONS

This application is the National Phase of International Application PCT/EP2012/070475 filed Oct. 16, 2012 which designated the U.S. and which claims priority to European Pat. App. No. 11188092.8 filed Nov. 7, 2011. The noted applications are incorporated herein by reference.

The present invention relates to a method of increasing the chlorine fastness of dyed natural or synthetic fibre materials, especially polyamide (PA) fibre materials, by treatment with specific thiourea derivatives and to thiourea/formaldehyde/bisphenol condensation products and thiourea/diisocyanate adducts applicable as auxiliary in this method.

Dyeings and prints obtained using dyes often exhibit a high level of sensitivity to chlorine and hypochlorite, respectively. For example, acid dyes are markedly degraded by chlorine, resulting in a change of their absorption properties and hence the colour. The shade of a grey trichromatic dyeing based on acid dyes on PA fabrics, for example on a woven polyamide carpet fabric, is rapidly changed to yellow by the action of chlorine or hypochlorite. Such a drawback is generally tackled by treating the dyed polyamide fibre material with natural or synthetic tannic acid derivatives. Said known compositions for improving resistance to chlorine, however, have drawbacks, for example that most of them strongly change the shade of the dyeing and reduce the light fastness. A further problem is that the chlorine resistance can be easily improved on PA 6.6 knitted fabrics, but the performance of these compounds is essentially reduced in the case of dyed carpet, were the requirements are distinctly stronger. There is therefore a need, in the treatment of synthetic polyamide fibre materials dyed, especially with acid dyes, for improved compositions for increasing the resistance to chlorine that do not have the drawbacks mentioned.

It has now been found that the chlorine fastness of dyeings on polyamide fibre material can be improved without or only slightly adversely affecting other fastness properties by subjecting them to treatment with particular thiourea derivatives.

Surprisingly, some of these thiourea derivatives additionally act as stain blocking agents; i.e. they effectively prevent the treated fibres from being stained by conventional food colorants.

The present invention relates to a method of increasing the chlorine fastness of dyed synthetic polyamide fibre materials, which comprises treating the fibre material after dyeing with an aqueous liquor comprising a condensation product of thiourea, formaldehyde and a bisphenol or a thiourea/diisocyanate adduct of formula

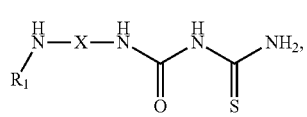

(1)

wherein X is hexamethylene or a radical of the formulae

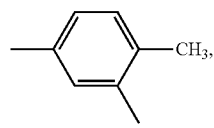

(2a)

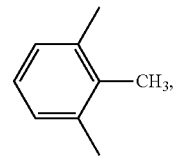

(2b)

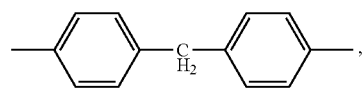

(2c)

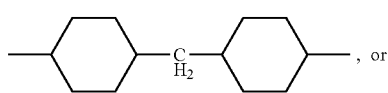

(2d)

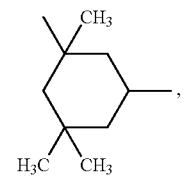

(2e)

$R_1$ represents hydrogen, —CO—$NR_2R_3$, —CO—O—N=$CR_4R_5$, —$COOR_6$ or —CO—NH—CS—$NH_2$, wherein $R_2$ denotes hydrogen, $C_1$-$C_6$alkyl, $C_6$-$C_{30}$aryl or $C_7$-$C_{36}$aralkyl, $R_3$ is $C_1$-$C_6$alkyl, $C_6$-$C_{30}$aryl or $C_7$-$C_{36}$aralkyl,
$R_4$ is hydrogen, $C_1$-$C_6$alkyl, $C_6$-$C_{30}$aryl or $C_7$-$C_{36}$aralkyl,
$R_5$ is $C_1$-$C_6$alkyl, $C_6$-$C_{30}$aryl or $C_7$-$C_{36}$aralkyl, and
$R_6$ is hydrogen, $C_1$-$C_6$alkyl, $C_6$-$C_{30}$aryl or $C_7$-$C_{36}$aralkyl.

Thiourea/formaldehyde condensates are known and can be prepared analogously to urea-formaldehyde resins by the reaction of thiourea with formaldehyde in alkaline solution, for example as described by H. S. Nalwa et al. in Mat. Res. Bull., 18, 897-902 (1983). The molecular weight of the condensate depends on the ratio of educts and the reaction conditions.

Frequently, oligomeric condensates are obtained, i.e. condensates of two molecules thiourea with two or three molecules formaldehyde.

The thiourea/formaldehyde condensates useful for application in the method according to the invention are condensation products of thiourea, formaldehyde and a bisphenol. Suitable bisphenols for the preparation of these condensation products are 4,4'-dihydroxybiphenyl, 4,4'-dihydroxydiphenyl ether, bisphenol A, bisphenol F and, in particular, bisphenol S (4,4'-dihydroxydiphenyl sulfone).

These compounds are novel and are a further object of the instant invention.

The condensation reaction can be carried out according to methods known per se, for example as described in U.S. Pat. No. 3,790,344, by reacting the educts in aqueous alkaline solution at elevated temperature.

Preferred thiourea/formaldehyde condensates are prepared from thiourea, formaldehyde, bisphenol S and phenol-4-sulfonic acid.

Among these thiourea/formaldehyde/amine-condensates tetrahydro-5-n-butyl-(S)-triazinethione and tetrahydro-5-furfuryl-(S)-triazinethione are especially preferred.

Further thiourea derivatives applicable in the claimed method are thiourea/isocyanate adducts. These compounds can be prepared by reaction of mono-, di- or polyisocyanates with thiourea in organic solvents at elevated temperatures and, where appropriate, subsequent hydrolysis or reaction with an amine or an alcohol.

Prior to the reaction of the di- or polyisocyanates with thiourea, it is possible to first react some of the isocyanate groups with a blocking agent in order to introduce blocked isocyanate groups in the molecule. In this way, products with a better durability can be obtained. Blocking agent for isocyanates are well known and can be, for example, phenols, oximes, lactames, alcohols, amides, secondary and hindered amines, malonic ester derivatives, pyrazoles, 1,2,4-triazoles, bisulfite adducts etc. . . .

Preferred blocking agents are oximes, especially butanone oxime.

Preferably, adducts prepared from 1 mol diisocyanate and 0.5-2.5 mol, more preferably 0.8-2.2 mol, thiourea are applied in the method according to the invention.

These compounds are novel and the invention further relates to a thiourea/diisocyanate adduct of formula $$\underset{R_1}{\overset{H}{N}}-X-\overset{H}{N}-\underset{O}{\overset{}{C}}-\overset{H}{N}-\underset{S}{\overset{}{C}}-NH_2, \quad (1)$$

wherein X is hexamethylene or a radical of the formulae (2a) 2,4-dimethylphenylene (2b) 2,6-dimethylphenylene (2c) diphenylmethane (2d) dicyclohexylmethane, or (2e) isophorone-type $R_1$ represents hydrogen, —CO—NR$_2$R$_3$, —CO—O—N=CR$_4$R$_5$ or —CO—NH—CS—NH$_2$, wherein $R_2$ denotes hydrogen, $C_1$-$C_6$alkyl, $C_6$-$C_{30}$aryl or $C_7$-$C_{36}$aralkyl, $R_3$ is $C_1$-$C_6$alkyl, $C_6$-$C_{30}$aryl or $C_7$-$C_{36}$aralkyl, $R_4$ is hydrogen, $C_1$-$C_6$alkyl, $C_6$-$C_{30}$aryl or $C_7$-$C_{36}$aralkyl, and $R_5$ is $C_1$-$C_6$alkyl, $C_6$-$C_{30}$aryl or $C_7$-$C_{36}$aralkyl.

$C_1$-$C_6$Alkyl as radical $R_2$, $R_3$, $R_4$ or $R_5$ can be, for example, methyl, ethyl, n-propyl, isopropyl, n-butyl, isobutyl, sec-butyl, tert-butyl, n-pentyl, neopentyl or n-hexyl.

The aryl radicals designated $R_2$, $R_3$, $R_4$ or $R_5$ have preferably from 6 to 24 carbon atoms, especially from 6 to 14 carbon atoms.

Examples of suitable aryl groups are phenyl, tolyl, mesityl, isityl, 2-hydroxyphenyl, 4-hydroxyphenyl, 2-chlorophenyl, 4-chlorophenyl, 2,6-dichlorophenyl, 2-aminophenyl, 3-aminophenyl, 4-aminophenyl, 4-methoxyphenyl, 4-ethoxyphenyl, naphthyl and phenanthryl.

The term "aralkyl" in the context of the invention includes aralkyl groups containing carbocyclic aromatic rings as well as aralkyl groups containing heterocyclic aromatic rings.

Aralkyl groups containing carbocyclic aromatic rings as $R_2$, $R_3$, $R_4$ or $R_5$ have preferably from 6 to 30 carbon atoms, especially from 7 to 12 carbon atoms.

Examples of suitable aralkyl groups are benzyl, 2-phenylethyl, tolylmethyl, mesitylmethyl and 4-chlorophenylmethyl.

Aralkyl groups containing heterocyclic aromatic rings as $R_2$, $R_3$, $R_4$ or $R_5$ contain preferably 4 or 5 carbon atoms in the aromatic ring and one or two hetero atoms from the group O, S and N. The heteroaromatic moiety may be, for example, pyrrolyl, furyl, thiophenyl, oxazolyl, thiazolyl, pyridyl, pyrazinyl, pyrimidinyl, pyridazinyl, indolyl, purinyl or quinolyl.

A preferred aralkyl group containing a heterocyclic aromatic ring is furfuryl.

Also preferred are compounds of formula (I) wherein $R_1$ is hydrogen, —CONH-furfuryl, —CO—N=C(CH$_3$)(C$_2$H$_5$) or —CO—NH—CS—NH$_2$.

Examples of compounds of formula (I) which can effectively be applied in the method according to the invention are the compounds of formulae (101)-(107)

(101)

(102)

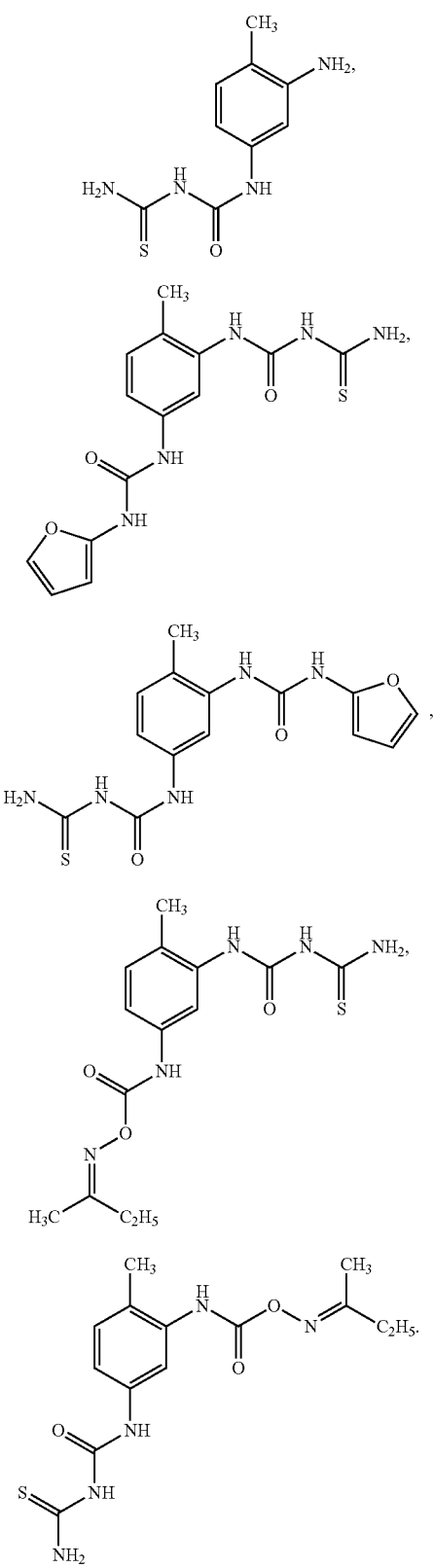

The thiourea derivatives employed in the method according to the invention are advantageously used in an amount of from 20 to 200 g/l, preferably from 20 to 100 g/l and especially from 30 to 90 g/l on carpets and preferably from 10 to 80 g/l, especially from 10 to 50 g/l on PA fabrics.

Suitable polyamide fibre material includes synthetic polyamide fibre material, e.g. polyamide-6 or polyamide-6.6, and fibre blends, e.g. polyamide/cellulose fibre blends, polyamide/wool fibre blends or polyamide/elastane fibre blends.

The textile material can be used in any form, e.g. in the form of fibres, yarn, woven fabric or knitted fabric.

The treatment of the polyamide fibre material with the thiourea derivatives can be carried out in accordance with conventional methods typically used in dyeing, pretreatment or finishing processes of textile materials, like the exhaust process and the padding process. Special apparatus is not required. For example, customary dyeing apparatus, e.g. open baths, winch becks, jigs, or paddle, jet or circulation apparatus, may be used.

Preferably, the fibre material is treated according to the pad-dry thermofix process or according to the foam process. The foam process is preferably used for the treatment of carpets.

If the treatment is carried out by the foam or the pad-dry thermofix process, the procedure is advantageously carried out at a temperature of from 80 to 180° C., preferably from 100 to 160° C. and especially from 120 to 150° C. The thermofixation time may be, for example, from 0.5 to 15 min and preferably from 1 to 5 min. The pH of the liquor is generally from 2 to 7, preferably from 3 to 5 and especially from 3.5 to 4.5.

The liquor can comprise, in addition to the adjuvant according to the invention, further customary additives, such as electrolytes, e.g. sodium chloride or sodium sulfate, dispersants and wetting agents, pH-regulators and antifoams.

The method claimed in the present invention is particularly convenient for the treatment of carpets because it does not only increase the chlorine fastness of the fibres but also, surprisingly, improves the stain resistance of the treated material.

The invention therefore also relates to a method of increasing the stain resistance of dyed synthetic polyamide carpets, which comprises treating the carpet after dyeing with an aqueous liquor comprising a thiourea/formaldehyde condensate.

The invention further relates to a method of increasing the stain resistance of dyed synthetic polyamide carpets, which comprises treating the carpet after dyeing with an aqueous liquor comprising a thiourea/formaldehyde condensate and a polycarboxylic acid.

The Examples that follow serve to illustrate the invention. The temperatures are given in degrees Celsius, parts are parts by weight, and percentages refer to percentages by weight, unless otherwise specified. Parts by weight relate to parts by volume in the same ratio as kilograms to litres.

I. PREPARATION EXAMPLES

I.1. Preparation of a condensation product of thiourea, formaldehyde and bisphenol S 32 g (0.184 mol) phenolsulfonic acid (65% solution in water) are diluted with 40 g water and neutralized with 41 g 4N—NaOH to pH 7.5. The neutralized phenolsulfonic acid dispersion is added to a suspension of 52 g (0.216 mol) bisphenol 5 and 21.6 g 30% NaOH in 170 g water. After addition of 14.6 g (0.192 mol) thiourea the flask is heated to 85° C. Subsequently, 42.1 g (0.519 mol) 37% formaldehyde are introduced within 30 min at 85° C. When the addition is completed, the mixture is heated at gentle reflux for 18 h. The product is diluted with water to yield a clear, yellow to slightly brown solution with a solids content of 25%.

I.2. Preparation of a condensation product of thiourea, formaldehyde and bisphenol S 32 g (0.184 mol) phenolsulfonic acid (65% solution in water) are diluted with 40 g water and neutralized with 41 g 4N—NaOH to pH 7.5. The neutralized phenolsulfonic acid dispersion is added to a suspension of 52 g (0.216 mol) bisphenol 5 and 21.6 g 30% NaOH in 170 g water placed in a pressure reactor. After addition of 14.6 g (0.192 mol) thiourea the flask is heated to 85° C. Subsequently, 42.1 g (0.519 mol) 37% formaldehyde are introduced within 30 min at 85° C. When the addition is completed, the reactor is closed and heated to 120° C. for 4 h. The product is diluted with water to yield a clear, yellow to slightly brown solution with a solids content of 25%.

I.3. Preparation of a Condensation product of thiourea, formaldehyde, bisphenol 5 and 4-phenolsulfonic acid 44.8 g (0.257 mol) 4-phenolsulfonic acid (65% solution in water) are diluted with 70 g water and neutralized with 54 g 4N—NaOH to pH 7.5. The neutralized phenolsulfonic acid dispersion is added to a suspension of 104 g (0.431 mol) bisphenol 5 and 42 g 30% NaOH in 170 g water placed in a pressure reactor. After addition of 29.2 g (0.384 mol) thiourea the flask is heated to 85° C. Subsequently, 70.5 g (0.869 mol) 37% formaldehyde are introduced within 30 min at 85° C. When the addition is completed, the reactor is closed and heated to 120° C. 30 for 4 h. The product is diluted with water to yield a clear, slightly brown solution with a solids content of 25%.

I.4. Condensation product of thiourea, formaldehyde and bisphenol S 8.5 g of a polymethacrylic acid solution (ACUMER® 1850, supplied by Rohm and Haas) are slowly added under stirring to 90 g of the product prepared in Example I.3. A cloudy solution is obtained.

I.5. Condensation product of thiourea, formaldehyde and bisphenol S 15 g of a styrene maleic anhydride copolymer solution (SMA® 1000 HNa, supplied by SARTOMER, $M_n$=2000, $M_w$=5500) are slowly added under stirring to 85 g of the product prepared in Example I.3. A clear solution is obtained.

I.6. Thiourea/diisocyanate adduct of formula (101)

139.2 g (0.8 mol) toluene-2,4-diisocyanate are dissolved in 410 ml 2-butanone. 122.4 g (1.6 mol) thiourea are added at 25-30° C. and the mixture is stirred 3 h at this temperature. During this period, a white product precipitates. The mixture is then heated to 80° C. for 15 h. 900 ml water are added and the solvent is distilled off. Subsequently, the white dispersion is ground in the presence of Baykanol® S (anionic surfactant, supplied by Bayer) to a particle size of 1 μm. After addition of water a viscous dispersion with a solids content of 23% is obtained.

I.7. Thiourea/diisocyanate adduct of formula (102/103)

87 g (0.5 mol) toluene-2,4-diisocyanate are dissolved in 200 ml 2-butanone. 38 g (0.5 mol) thiourea are added to 25-30° C. and the mixture is stirred 3 h at this temperature and subsequently 1 h to 40° C. During this period, a white product precipitates. 500 ml water are added and the solvent is distilled off. Afterwards, the white dispersion is ground in the presence of Baykanol® S to a particle size of 1 μm. After addition of water a viscous dispersion with a solids content of 20% is obtained.

I.8. Thiourea/diisocyanate adduct of formula (104/105)

130.5 g (0.75 mol) toluene-2,4-diisocyanate are dissolved in 300 ml 2-butanone. 57 g (0.75 mol) thiourea are added at 25-30° C. and the mixture is stirred 3 h at this temperature and subsequently 1 h to 40° C. During this period, a white product precipitates. 48.6 g (0.5 mol) furfurylamine are slowly added (exothermic reaction) and the mixture is heated 3 hours to 80° C. 600 ml water are added and the solvent is distilled off.

Afterwards, the white dispersion is ground in the presence of Baykanol® S to a particle size of 1 μm. After addition of water a viscous dispersion with a solids content of 22% is obtained.

I.9. Thiourea/diisocyanate adduct with blocked isocyanate groups of formula (106/107)

87 g (0.5 mol) toluene-2,4-diisocyanate are dissolved in 250 ml 2-butanone. 17.4 g (0.2 mol) butanone oxime are added within 60 minutes at 25-30° C. At the end of the addition, the mixture is stirred 30 minutes at 40° C.

60.8 g (0.8 mol) thiourea are added at 40° C. and the mixture is stirred 3 h at this temperature and subsequently 15 h to 80° C. 500 ml water are added to the white dispersion and the solvent is distilled off. Afterwards, the white dispersion is ground in the presence of 3% Baykanol® S to a particle size of 1 μm. After addition of water a viscous dispersion with a solids content of 22% is obtained.

II. Application Examples

II.1. Stain blocking on PA 6

Pieces of PA 6 carpet are dyed at pH 6.0 using a dye mixture containing 0.069% TECTILON® Yellow MP-R (Acid dye, supplied by HUNTSMAN), 0.041% TECTILON® Red 2B (Acid dye, supplied by HUNTSMAN) and 0.081% TECTILON® Blue 4R-01 (Acid dye, supplied by HUNTSMAN). A grey-colored carpet is obtained.

70 g/l of the products prepared in Examples 1.1 to 1.5 are applied at pH 4 on the pre-dyed PA 6 carpet pieces according to the pad-dry-thermofix process with a pick up of 100% (drying step: 20 min/80° C., thermofix step: 5 min/150° C.).

The thus treated specimens are subjected to the stain resistance test according to AATCC 175-2003 and the chlorine fastness test according to a slightly modified AATCC 175-2003 test, wherein a 10% Chlorox® solution (about 6000 ppm active chlorine) is applied instead of the dye solution. The results are summarized in Table 1.

TABLE 1

| | Stain resistance | Fastness to chlorine |
| --- | --- | --- |
| Untreated | 1 | 1 |
| Treated with product of Ex. I.1 | 7 | 3 |
| Treated with product of Ex. I.2 | 7 | 3 |
| Treated with product of Ex. I.3 | 6 | 4-5 |

TABLE 1-continued

| | Stain resistance | Fastness to chlorine |
|---|---|---|
| Treated with product of Ex. I.4 | 8-9 | 4 |
| Treated with product of Ex. 1.5 | 9-10 | 3-4 |

Rating for the stain test: 1 to 10, best rate: 10
Rating for the chlorine test: 1 to 5, best rate: 5

Similar results are obtained, when the products of Ex. I.1 to I.5 are applied on a dyed carpet according to the foam process, using 5 g/l Dicrylan Foamer HP for preparing the foam, drying 30 minutes at 50° C., curing 5 minutes at 150° C.

II.2. Fastness to chlorine on PA 6

The products of Examples 1.6 to 1.9 are applied at pH 4 on a pre-dyed grey PA 6 carpet (see Example II.1.) according to the pad-dry-thermofix process with a pick up of 100% (drying step: 20 min/80° C., thermofix step: 5 min/150° C.).

The thus treated specimens are subjected to the chlorine fastness test according to the same method as in Example 11.1. The results are summarized in Table 2.

TABLE 2

| | Amount used [g/l] | Chlorine fastness |
|---|---|---|
| Untreated | | 1 |
| Treated with product of Ex. I.6 | 60 | 4 |
| Treated with product of Ex. I.7 | 60 | 3 |
| Treated with product of Ex. I.8 | 60 | 3 |
| Treated with product of Ex. I.9 | 60 | 4 |

Rating for the chlorine fastness test: 1 to 5, best rate: 5

II.3 Fastness to chlorine on PA 6.6 knitted fabric

PA 6.6 knitted fabrics are dyed according to the exhaust process using a mixture containing 0.13% ERIONYL® Yellow A-3G (Acid dye, supplied by HUNTSMAN) and 0.089% ERIONYL® Blue A-4G (Acid dye, supplied by HUNTSMAN). Green colored fabrics are obtained.

The fabrics are treated with several products obtained in Examples I.3., I.6. and I.9 according to the pad-dry-thermofix process (drying step: 3 min/110° C., thermofix step: 0.5 min/180° C.). Fastness to chlorine is determined according to ISO 105E03; the results are summarized in Table 3.

TABLE 3

| | Amount [g/l] | Chlorine fastness | Shade change [dE] | Light fastness |
|---|---|---|---|---|
| Untreated | | 1 | | 2.5 |
| Treated with ERIONAL ® CL | 50 | 4.5 | 1.3 | 2.5 |
| Treated with ERIONAL ® CL | 80 | 4.5 | 2.3 | 2 |
| Treated with product of Ex. I.3 | 50 | 4.5 | 0.8 | 3 |
| Treated with product of Ex. I.3 | 80 | 4.5 | 0.8 | 3 |
| Treated with product of Ex. I.6 | 50 | 4.5 | 0.8 | 3 |
| Treated with product of Ex. I.6 | 80 | 4 | 0.8 | 2.5 |
| Treated with product of Ex. I.9 | 50 | 4.5 | 0.8 | 3 |
| Treated with product of Ex. I.9 | 80 | 4.5 | 0.9 | 3 |

Rating for the chlorine fastness test: 1 to 5, best rate: 5
Rating for the light fastness test: 1 to 5, best rate: 5
ERIONAL ® CL: textile auxiliary (supplied by Huntsman)

What is claimed is:

1. A method of increasing the chlorine fastness of dyed synthetic polyamide fibre materials, which comprises treating the fibre material after dyeing with an aqueous liquor comprising a condensation product of thiourea, formaldehyde and a bisphenol or a thiourea/diisocyanate adduct of formula

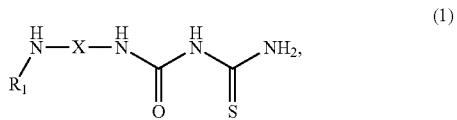

(1)

wherein X is hexamethylene or a radical of the formulae

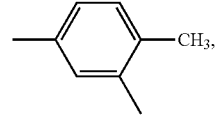

(2a)

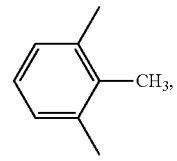

(2b)

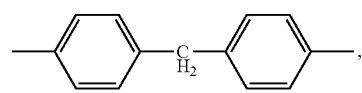

(2c)

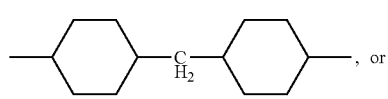

(2d)

, or

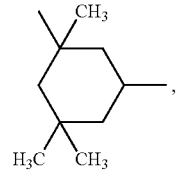

(2e)

$R_1$ represents hydrogen, —CO—NR$_2$R$_3$, —CO—O—N=CR$_4$R$_5$, —COOR$_6$ or —CO—NH—CS—NH$_2$, wherein $R_2$ denotes hydrogen, $C_1$-$C_6$ alkyl, $C_6$-$C_{30}$ aryl or $C_7$-$C_{36}$ aralkyl, $R_3$ is $C_1$-$C_6$ alkyl, $C_6$-$C_{30}$ aryl or $C_7$-$C_{36}$ aralkyl, $R_4$ is hydrogen, $C_1$-$C_6$ alkyl, $C_6$-$C_{30}$ aryl or $C_7$-$C_{36}$ aralkyl, $R_5$ is $C_1$-$C_6$ alkyl, $C_6$-$C_{30}$ aryl or $C_7$-$C_{36}$ aralkyl, and $R_6$ is hydrogen, $C_1$-$C_6$ alkyl, $C_6$-$C_{30}$ aryl or $C_7$-$C_{36}$ aralkyl.

2. A method according to claim 1 wherein the aqueous liquor contains a condensation product of thiourea, formaldehyde and a bisphenol.

3. A method according to claim 2 wherein the aqueous liquor contains a condensation product of thiourea, formaldehyde and bisphenol S.

4. A method according to claim 1 wherein the aqueous liquor contains a thiourea/diisocyanate adduct of formula (1).

5. A condensation product of thiourea, formaldehyde, bisphenol S and phenol-4-sulfonic acid.

6. A thiourea/diisocyanate adduct of formula

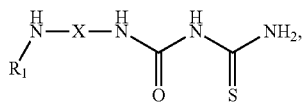

(1)

wherein X is hexamethylene or a radical of the formulae

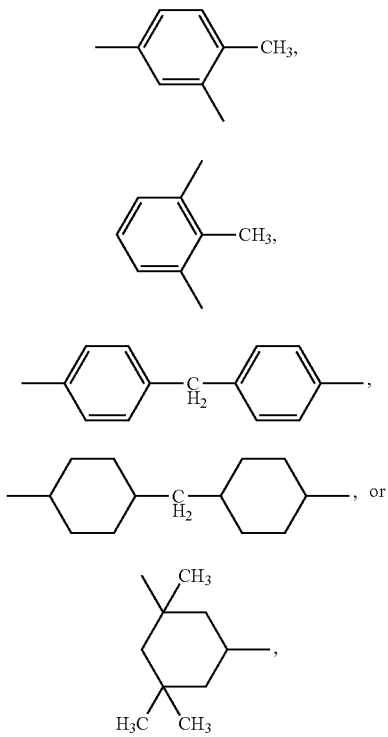

R$_1$ represents hydrogen, —CO—NR$_2$R$_3$, —CO—O—N=CR$_4$R$_5$ or —CO—NH—CS—NH$_2$, wherein R$_2$ denotes hydrogen, C$_1$-C$_6$ alkyl, C$_6$-C$_{30}$ aryl or C$_7$-C$_{36}$ aralkyl, R$_3$ is C$_1$-C$_6$ alkyl, C$_6$-C$_{30}$aryl or C$_7$-C$_{36}$ aralkyl, R$_4$ is hydrogen, C$_1$-C$_6$ alkyl, C$_6$-C$_{30}$ aryl or C$_7$-C$_{36}$ aralkyl, and R$_5$ is C$_1$-C$_6$ alkyl, C$_6$-C$_{30}$aryl or C$_7$-C$_{36}$ aralkyl.

7. A thioure/diisocyanate adduct of the formulae (101) - (107)

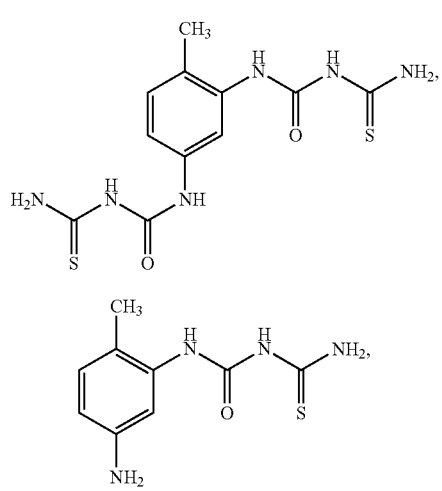

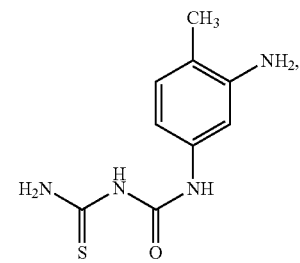

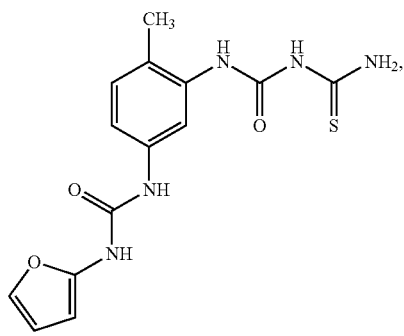

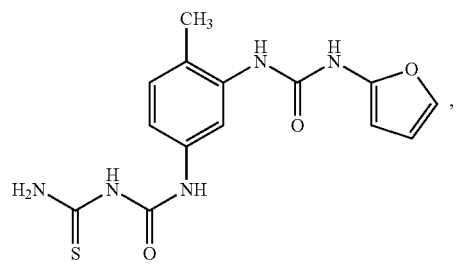

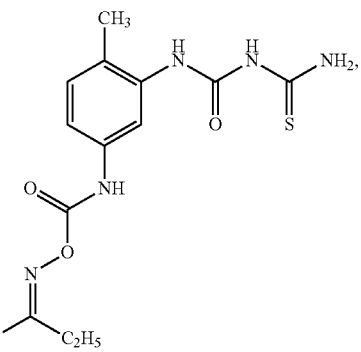

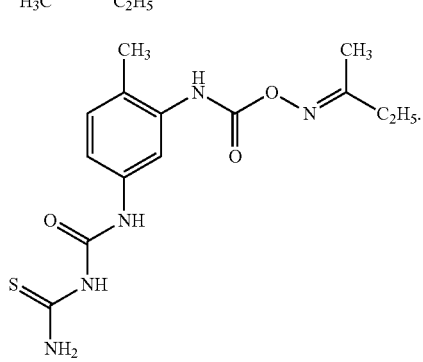

8. A method according to claim 1 wherein the fibre material is treated according to the pad-dry thermofix process or according to the foam process.

9. A method of increasing the stain resistance of dyed synthetic polyamide carpets, which comprises treating the carpet after dyeing with an aqueous liquor comprising a condensation product of thiourea, formaldehyde and a bisphenol.

10. A method of increasing the stain resistance of dyed synthetic polyamide carpets, which comprises treating the carpet after dyeing with an aqueous liquor comprising a condensation product of thiourea, formaldehyde and a bisphenol and a polycarboxylic acid.

* * * * *